United States Patent
Bae

(10) Patent No.: US 8,754,844 B2
(45) Date of Patent: Jun. 17, 2014

(54) DISPLAY DEVICE USING ELECTROWETTING

(75) Inventor: Jung-mok Bae, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 368 days.

(21) Appl. No.: 12/805,646

(22) Filed: Aug. 11, 2010

(65) Prior Publication Data

US 2011/0084944 A1 Apr. 14, 2011

(30) Foreign Application Priority Data

Oct. 14, 2009 (KR) .................. 10-2009-0097738

(51) Int. Cl.
*G09G 3/34* (2006.01)

(52) U.S. Cl.
USPC .......... 345/107; 359/267; 359/265; 359/666; 359/296; 359/270; 359/276; 359/245; 345/93; 345/179

(58) Field of Classification Search
None
See application file for complete search history.

(56) References Cited

U.S. PATENT DOCUMENTS

| | | | |
|---|---|---|---|
| 3,956,014 A * | 5/1976 | Landsman et al. ............ 429/524 |
| 5,847,860 A * | 12/1998 | Hougham et al. ............ 359/267 |
| 6,352,758 B1 * | 3/2002 | Huang et al. ................. 428/143 |
| 7,548,363 B2 | 6/2009 | Hayes et al. |
| 7,723,765 B2 * | 5/2010 | Park .............................. 257/292 |
| 7,847,996 B2 * | 12/2010 | Chen et al. ................... 359/228 |
| 8,035,879 B2 * | 10/2011 | Wang et al. .................. 359/245 |
| 8,111,465 B2 * | 2/2012 | Heikenfeld et al. .......... 359/665 |
| 2004/0253826 A1 * | 12/2004 | Ivanov et al. ................. 438/710 |
| 2006/0215274 A1 * | 9/2006 | Renders et al. ............... 359/666 |
| 2008/0130087 A1 * | 6/2008 | Miyata et al. ................. 359/267 |
| 2008/0150867 A1 * | 6/2008 | Miyata et al. ................... 345/93 |
| 2008/0157067 A1 * | 7/2008 | Shiba et al. ..................... 257/40 |
| 2009/0052004 A1 * | 2/2009 | Nakano et al. ................ 359/270 |
| 2009/0059348 A1 * | 3/2009 | Niwano et al. ................ 359/296 |
| 2010/0200512 A1 * | 8/2010 | Chase et al. .................. 210/708 |
| 2010/0284056 A1 * | 11/2010 | Giraldo ......................... 359/292 |

FOREIGN PATENT DOCUMENTS

| | | |
|---|---|---|
| KR | 1020060011039 A | 2/2006 |
| KR | 1020070097810 A | 10/2007 |
| WO | WO-2004077124 A1 | 9/2004 |

* cited by examiner

*Primary Examiner* — Kent Chang
*Assistant Examiner* — Benjamin Morales Fernande
(74) *Attorney, Agent, or Firm* — Harness, Dickey & Pierce, P.L.C.

(57) ABSTRACT

Provided is a display device using electrowetting including a reservoir layer in which a reservoir for storing oil and transparent water-soluble liquid is formed. A first electrode and a second electrode may be formed on an upper surface of the reservoir layer and on an inner wall of the reservoir, respectively.

22 Claims, 5 Drawing Sheets

DISPLAY DEVICE USING ELECTROWETTING

CROSS-REFERENCE TO RELATED APPLICATIONS

This application claims priority under U.S.C. §119 to Korean Patent Application No. 10-2009-0097738, filed on Oct. 14, 2009, in the Korean Intellectual Property Office, the entire contents of which are incorporated herein by reference.

BACKGROUND

1. Field

Example embodiments relate to display devices, and more particularly, to electrowetting display devices.

2. Description of the Related Art

Most display devices, including current mobile display devices or large display devices, may be transmission-type display devices, e.g., transparent liquid crystal displays (LCDs) that use a backlight unit as a light source. However, when transmission-type display devices are used outdoors, the brightness and contrast thereof may be degraded due to external light, leading to a reduction in visibility. In particular, transmission-type LCDs consume a relatively large amount of power because liquid crystals of the transmission-type LCDs have lower light transmissivity and a voltage needs to be continuously applied to form an image. For this reason, application of reflection-type display devices to mobile products has been attempted. The reflection-type display devices use external light, and thus consume less power and have improved visibility in outdoor settings compared with the transmission-type display devices in outdoor settings. Reflection-type display devices are being researched to provide higher reflectivity, higher contrast, and a higher gray scale representation capability in order to secure image quality at the same level as printed images.

Display devices using electrowetting form images by controlling the intensity and wavelength band of light that passes through each pixel using a principle in which the wetting characteristics of a surface may be changed according to voltage. Such display devices using electrowetting do not use a polarization plate, and thus, may improve reflectivity or transmissivity at least twice as much when compared with LCDs. In addition, such display devices using electrowetting have a response speed of about 10 ms or less, which may be relatively fast.

SUMMARY

Example embodiments provide display devices using electrowetting. Additional aspects will be set forth in part in the description which follows and, in part, will be apparent from the description, or may be learned by practice of example embodiments.

According to example embodiments, a display device may include a plurality of pixels, each including a first substrate and a second substrate arranged a distance apart from each other; a reservoir layer on the first substrate and including a reservoir; a first electrode and a second electrode on an upper surface of the reservoir layer and on an inner wall of the reservoir, respectively; a first dielectric layer on the reservoir layer to cover the first and second electrodes, the first dielectric layer having a hydrophobic surface; a third electrode on a lower surface of the second substrate; a second dielectric layer on the lower surface of the second substrate to cover the third electrode, the second dielectric layer having a hydrophobic surface; and a transparent water-soluble liquid and an oil having a color filling a space between the first dielectric layer and the second dielectric layer.

A first thin film transistor (TFT) for applying a voltage to the first electrode and a second TFT for applying a voltage to the second electrode may be formed on the first substrate. A protection layer may be formed on the first substrate to cover the first and second TFTs.

The first electrode may be formed of a reflective metal. An optical pattern may be between the first electrode and the reservoir layer, the optical pattern diffusing light on the upper surface of the reservoir layer. The third electrode may be formed of a transparent conductive material.

A gray scale may be controlled according to a magnitude of a voltage applied to the first electrode or the second electrode. A backlight unit may be installed on a lower surface of the first substrate. In example embodiments, the first electrode may be formed of a transparent conductive material.

The display device may further include a fourth electrode on an upper surface of the first electrode to cover a portion of the first electrode. In example embodiments, the fourth electrode may be formed of reflective metal.

According to example embodiments, a display device may include a plurality of pixels, each including a first substrate and a second substrate arranged a distance apart from each other; a reservoir layer on the first substrate and including a reservoir; a first electrode and a second electrode on an upper surface of the reservoir layer and on an inner wall of the reservoir, respectively; a plurality of first dielectric layers and a plurality of second dielectric layers alternately formed on the upper surface of the reservoir layer to cover the first electrode, the plurality of first and second dielectric layers having hydrophobic surfaces and hydrophilic surfaces, respectively; a third dielectric layer on the inner wall of the reservoir to cover the second electrode, the third dielectric layer having a hydrophobic surface; a third electrode on a lower surface of the second substrate; a plurality of fourth dielectric layers and a plurality of fifth dielectric layers alternately formed on a lower surface of the second substrate to cover the third electrode, the plurality of fourth and fifth dielectric layer having hydrophobic surfaces and hydrophilic surfaces, respectively; and a transparent oil and a water-soluble liquid having a color filling a space between the first, second, and third dielectric layers and the fourth and fifth dielectric layers.

The first and second dielectric layers may alternate with each other in a direction in which the water-soluble liquid moves, and the fourth and fifth dielectric layers may alternate with each other in the direction in which the water-soluble liquid moves.

A gray scale may be controlled according to a period of time that a voltage may be applied to the first electrode or the second electrode. A backlight unit may be installed on a lower surface of the first substrate. In example embodiments, the first electrode may be formed of a transparent conductive material.

The display device may further include a fourth electrode on an upper surface of the first electrode to cover a portion of the first electrode. A reservoir for storing water-soluble liquid or oil may be formed to increase an area of a pixel through which light may be reflected or emitted. Thus, a display device having improved reflectivity or transmissivity may be achieved.

In addition, dielectric layers having hydrophobic surfaces and second dielectric having hydrophilic surfaces alternate with each other to maintain a screen state of a display device even when no voltage may be applied. Therefore, bistability may be secured, and power consumption required to drive a display device may be reduced.

BRIEF DESCRIPTION OF THE DRAWINGS

Example embodiments will be more clearly understood from the following detailed description taken in conjunction with the accompanying drawings.

FIGS. 1 through 6 are cross-sectional views of a reflection-type display device according to example embodiments;

FIGS. 7 and 8 are cross-sectional views of a transmission-type display device according to example embodiments; and FIGS. 9 and 10 are cross-sectional views of a reflection and transmission-type display device according to example embodiments.

Figure 1:
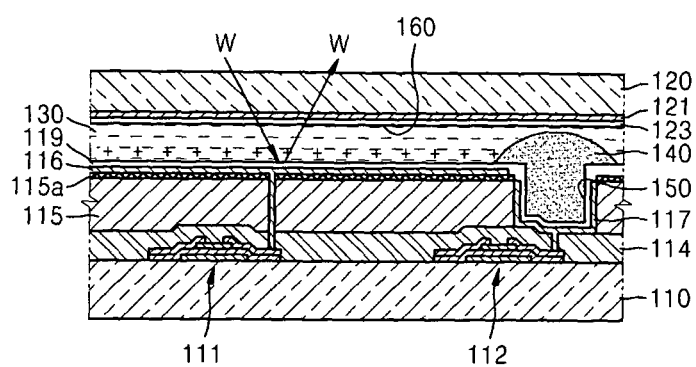
FIGS. 1-10 represent non-limiting, example embodiments as described herein.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

Reference will now be made in detail to embodiments, examples of which are illustrated in the accompanying drawings, wherein like reference numerals refer to the like elements throughout. In this regard, example embodiments may have different forms and should not be construed as being limited to the descriptions set forth herein. Accordingly, example embodiments are merely described below, by referring to the figures, to explain aspects of the present description. In the drawings, the sizes or thicknesses of elements are exaggerated for clarity, and like reference numerals denote like elements. It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given example embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Figure 2:
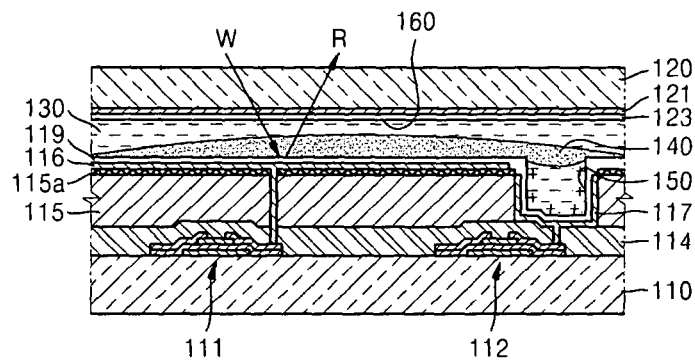
Figure 3:
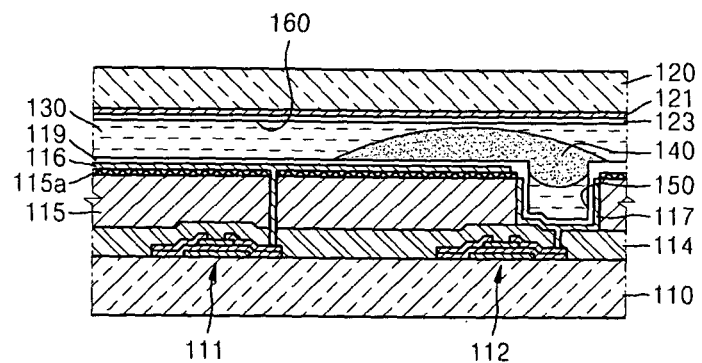

FIGS. 1 through 3 are cross-sectional views of a reflection-type display device according to example embodiments. For convenience of explanation, FIGS. 1 through 3 illustrate cross-sections of a single pixel of the reflection-type display device according to example embodiments.

Referring to FIGS. 1 through 3, a first substrate 110, as a lower substrate, and a second substrate 120, as an upper substrate, may be arranged a predetermined or given distance apart from each other. The first and second substrates 110 and 120 may be transparent substrates, for example, glass substrates or plastic substrates. However, the first and second substrates 110 and 120 may be any of various types of substrates. First and second thin film transistors (TFTs) 111 and 112 may be formed on an upper surface of the first substrate 110. The first and second TFTs 111 and 112 may be switching devices for applying voltages to first and second electrodes 116 and 117, which are described later. A protection layer 114 may be formed on the first substrate 110 to cover the first and second TFTs 111 and 112.

A reservoir layer 115 may be formed on the protection layer 114. A reservoir 150 for storing oil 140 having a predetermined or given color (for example, red) and transparent water-soluble liquid 130, which are described later, may be disposed in the reservoir layer 115. The reservoir 150 provides a space in which the oil 140 may be stored, thereby improving the reflectivity or transmissivity of the reflection-type display device, as will be described later. The reservoir layer 115 may have a thickness of, for example, about several tens of µm. The reservoir layer 115 may be formed by coating a photoresist on the protection layer 114 and patterning the photoresist according to a photolithographic process. Alternatively, the reservoir layer 115 may be formed using an imprinting technique that uses a soft mold.

The first electrode 116 may be formed on an upper surface of the reservoir layer 115. The first electrode 116 may be electrically connected to the first TFT 111 via a path formed through the reservoir layer 115 and the protection layer 114. The first electrode 116 may be formed of a metal that reflects light. An optical pattern 115a diffusing light reflected by the first electrode 116 may be further formed on the upper surface of the reservoir layer 115 so as to be interposed between the first electrode 116 and the reservoir layer 115. The second electrode 117 may be formed on an inner wall of the reservoir 150. The second electrode 117 may be electrically connected to the second TFT 112 via a path through the protection layer 114. The second electrode 117 may be formed of a transparent conductive material, e.g., Indium Tin Oxide (ITO) and/or a metal.

A first dielectric layer 119 may be formed on the reservoir layer 115 to cover the first and second electrodes 116 and 117. The first dielectric layer 119 has a hydrophobic surface. The first dielectric layer 119 having the hydrophobic surface may be formed by coating an upper surface of the first dielectric layer 119 with a hydrophobic thin film or may be formed of a hydrophobic dielectric.

A third electrode 121 may be formed on a lower surface of the second substrate 120. The third electrode 121 may be formed of a transparent conductive material, e.g., ITO. A second dielectric layer 123 may be formed on the lower surface of the second substrate 120 to cover the third electrode 121. The second dielectric layer 123 has a hydrophobic surface, like the first dielectric layer 119.

A channel 160, in which the transparent water-soluble liquid 130 and the oil 140 having the predetermined or given color (for example, red) may move, may be formed between the first and third electrodes 116 and 121 and may lead to the reservoir 150 between the second and third electrodes 117 and 121. The reservoir 150 may be formed on one side of the channel 160. The channel 160 and the reservoir 150 in between the first dielectric layer 119 and the second dielectric layer 123 may be filled with the transparent water-soluble liquid 130 and the oil 140 having the predetermined or given color (for example, red). The transparent water-soluble liquid 130 may include, for example, water.

A process in which the reflection-type display device according to example embodiments forms an image will now be described with reference to FIGS. 1 through 3. FIG. 1 illustrates a state of the reflection-type display device where a voltage may be applied to only the first electrode 116 and no voltage may be applied to the second electrode 117. FIG. 2 illustrates a state of the reflection-type display device where the voltage applied to the first electrode 116 may be turned off and a voltage may be applied to the second electrode 117.

Referring to FIG. 1, a voltage may be applied to only the first electrode 116 and no voltage may be applied to the second electrode 117. Accordingly, a portion of the first dielectric layer 119 on the first electrode 116 may be changed from being hydrophobic to being hydrophilic. A portion of the first dielectric layer 119 on the second electrode 117 formed on the inner wall of the reservoir 150 may be maintained as hydrophobic. The transparent water-soluble liquid 130 and the oil 140 move fast due to electrowetting. In other words, the transparent water-soluble liquid 130 moves toward the channel 160 between the first and third electrodes 116 and 121, and the oil 140 having the predetermined or given color (for example, red) moves toward the reservoir 150 to fill the reservoir 150.

In this state, white light W incident upon the pixel from an external source passes through the transparent water-soluble liquid 130 and may be reflected by the first electrode 116. Thus, the pixel discharges the white light W. The oil 140 having the predetermined or given color may be stored in the reservoir 150, which may be formed on one side of the pixel, so that an area of the pixel through which the white light W is emitted may increase. Thus, the reflectivity of the reflection-type display device according to example embodiments may increase.

Referring to FIG. 2, the voltage applied to the first electrode 116 may be turned off and a voltage may be applied to the second electrode 117. Accordingly, the hydrophilic portion of the first dielectric layer 119 on the first electrode 116 returns to being hydrophobic, and the portion of the hydrophobic surface of the first dielectric layer 119 on the second electrode 117 formed on the inner wall of the reservoir 150 may be changed from being hydrophobic to hydrophilic. The oil 140 filled in the reservoir 150 moves toward the channel 160 between the first and third electrodes 116 and 121 due to electrowetting, and thus, covers the first dielectric layer 119 on the first electrode 116. The transparent water-soluble liquid 130 moves toward the reservoir 150 due to electrowetting to fill the reservoir 150. In this state, the white light W incident upon the pixel from the external source passes through the oil 140 having the predetermined or given color (for example, red) and may be reflected by the first electrode 116 and emitted. Thus, the pixel emits red light R.

According to example embodiments, a gray scale representation may be achieved according to the magnitude of the voltage applied to the first electrode 116 or the second electrode 117. An area of the first dielectric layer 119 that the oil 140 covers may vary according to the magnitude of the voltage applied to the first electrode 116 or the second electrode 117. Therefore, when the magnitude of the voltage applied to the first electrode 116 or the second electrode 117 is controlled, the area of the first dielectric layer 119 that the oil 140 covers may be accordingly adjusted as illustrated in FIG. 3. Thus, a desired gray scale may be represented.

Figure 4:
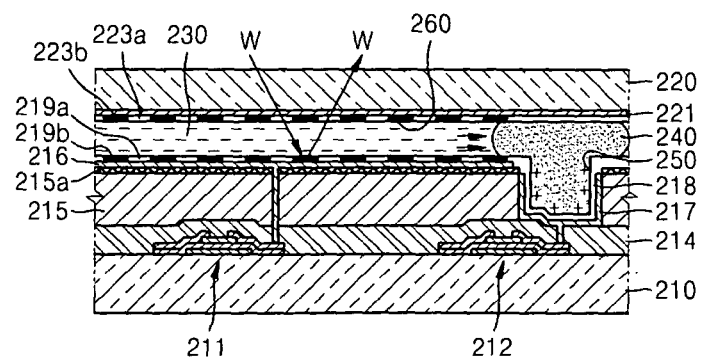
Figure 5:
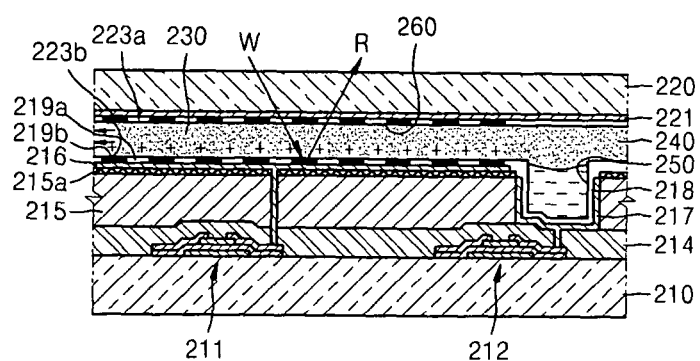
Figure 6:
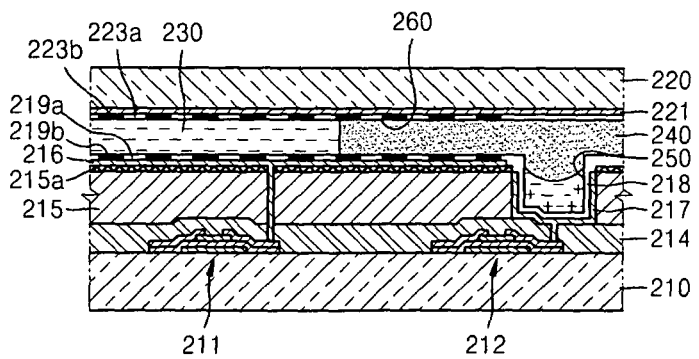

FIGS. 4 through 6 are cross-sectional views of a reflection-type display device according to example embodiments. For convenience of explanation, FIGS. 4 through 6 illustrate cross-sections of a single pixel of the reflection-type display device. Referring to FIGS. 4 through 6, a first substrate 210, as a lower substrate, and a second substrate 220, as an upper substrate, may be arranged a predetermined or given distance apart from each other. First and second TFTs 211 and 212 may be formed on an upper surface of the first substrate 210. A protection layer 214 may be formed on the first substrate 210 to cover the first and second TFTs 211 and 212.

A reservoir layer 215 may be formed on the protection layer 214. A reservoir 250 for storing water-soluble liquid 240 having a predetermined or given color (for example, red) and transparent oil 230, which is described later, may be disposed in the reservoir layer 215. The reservoir 250 provides a space in which the water-soluble liquid 240 may be stored, thereby improving the reflectivity or transmissivity of the reflection-type display device.

A first electrode 216 may be formed on an upper surface of the reservoir layer 215. The first electrode 216 may be electrically connected to the first TFT 211 via a path through the reservoir layer 215 and the protection layer 214. The first electrode 216 may be formed of a metal that reflects light. An optical pattern 215a diffusing light reflected by the first electrode 216 may be further formed on the upper surface of the reservoir layer 215 so as to be interposed between the first electrode 216 and the reservoir layer 215. A second electrode 217 may be formed on an inner wall of the reservoir 250. The second electrode 217 may be electrically connected to the second TFT 212 via a path through the protection layer 214. The second electrode 217 may be formed of a transparent conductive material, e.g., ITO and/or a metal.

A plurality of first dielectric layers 219a and a plurality of second dielectric layers 219b may be alternately formed on the reservoir layer 215 to cover the first electrode 216. Surfaces of the first and second dielectric layers 219a and 219b may be hydrophobic and hydrophilic, respectively. The first and second dielectric layers 219a and 219b may alternate with each other in a direction in which the water-soluble liquid 240 may move. The first and second dielectric layers 219a and 219b may be formed in a stripe pattern. A third dielectric layer 218 having a hydrophobic surface may be formed on the inner wall of the reservoir 250 to cover the second electrode 217.

A third electrode 221 may be formed on a lower surface of the second substrate 220. The third electrode 221 may be formed of a transparent conductive material, e.g., ITO. A plurality of fourth dielectric layers 223a and a plurality of fifth dielectric layers 223b may be alternately formed on the lower surface of the second substrate 220 to cover the third electrode 221. Surfaces of the fourth and fifth dielectric layers 223a and 223b may be hydrophobic and hydrophilic, respectively. The fourth and fifth dielectric layers 223a and 223b may alternate with each other so as to face the first and second dielectric layers 219a and 219b, respectively. In other words, the fourth and fifth dielectric layers 223a and 223b may alternate with each other with respect to the direction in which the water-soluble liquid 240 may move.

A channel 260, in which the transparent oil 230 and the water-soluble liquid 240 may move, may be formed between the first and third electrodes 216 and 221 and leads to the reservoir 250 between the second and third electrodes 217 and 221. The reservoir 250 may be formed on one side of the channel 260. The channel 260 and the reservoir 250 in between the first, second, and third dielectric layers 219a, 219b, and 218 and the fourth and fifth dielectric layers 223a and 223b may be filled with the transparent oil 230 and the water-soluble liquid 240 having the predetermined or given color (for example, red).

A process in which the reflection-type display device according to example embodiments forms an image will now be described with reference to FIGS. 4 through 6. FIG. 4 illustrates a state of the reflection-type display device where no voltage may be applied to the first electrode 216 and a voltage may be applied to only the second electrode 217. FIG. 5 illustrates a state of the reflection-type display device where a voltage may be applied to only the first electrode 216 and no voltage may be applied to the second electrode 217.

Referring to FIG. 4, a voltage may be applied to only the second electrode 217 and no voltage may be applied to the first electrode 216. Accordingly, a portion of the third dielectric layer 218 on the second electrode 217 formed on the inner wall of the reservoir 250 may be changed from being hydrophobic to being hydrophilic. The surfaces of the first and second dielectric layers 219a and 219b on the first electrode 216 may be maintained as hydrophobic and hydrophilic surfaces, respectively. The water-soluble liquid 240 having the predetermined or given color (for example, red) moves toward the reservoir 250 to fill the reservoir 250, and the transparent oil 230 moves toward the channel 260 between the first and third electrodes 216 and 221.

In this state, white light W incident upon the pixel from an external source passes through the transparent oil 230 within the channel 260 and may be reflected by the first electrode 216, and thus, the pixel discharges the white light W. Most of the water-soluble liquid 240 having the predetermined or given color may be stored in the reservoir 250, which may be formed on one side of the pixel, so that an area of the pixel through which the white light W is emitted may increase. Thus, the reflectivity of the reflection-type display device according to example embodiments may increase. In example embodiments, the plurality of first dielectric layers 219a and the plurality of second dielectric layers 219b having hydrophobic surfaces and hydrophilic surfaces, respectively, alternate on the first electrode 216, and the plurality of fourth dielectric layers 223a and the plurality of fifth dielectric layers 223b having hydrophobic surfaces and hydrophilic surfaces, respectively, alternate on the third electrode 221.

Thus, bistability in which an image may be maintained even when the voltage applied to the second electrode 217 is turned off may be secured. In other words, in example embodiments, an image corresponding to the white light W formed by applying a voltage to the second electrode 217 may be maintained even when the voltage applied to the second electrode 217 may be turned off. If bistability is secured, power consumption required to drive a display device may be reduced.

Referring to FIG. 5, a voltage may be applied to only the first electrode 216, and no voltage may be applied to the second electrode 217. Accordingly, the surfaces of the first dielectric layers 219a on the first electrode 216 changes from being hydrophobic surfaces to being hydrophilic surfaces, and the surfaces of the second dielectric layers 219b on the first electrode 216 may be maintained as hydrophilic surfaces. The surface of the third dielectric layer 218 on the second electrode 217 formed on the inner wall of the reservoir 250 may be maintained as being hydrophilic. The water-soluble liquid 240 having the predetermined or given color (for example, red) moves quickly toward the channel 260 due to a capillary phenomenon to fill the channel 260, and the transparent oil 230 moves toward the reservoir 250 to fill the reservoir 250.

In this state, the white light W incident upon the pixel from the external source passes through the water-soluble liquid 240 having the predetermined or given color (for example, red) and may be reflected by the first electrode 216. Thus, the pixel emits, for example, red light R. Most of the transparent oil 230 may be stored in the reservoir 250, so that an area of the pixel through which the red light R is emitted may increase. In addition, in example embodiments, because bistability is secured as described above, an image corresponding to the red light R emitted from the pixel may also be maintained even when the voltage applied to the second electrode 217 is turned off.

According to example embodiments, a gray scale representation may be achieved according to a period of time that a voltage is applied to the first electrode 216 or the second electrode 217. In other words, in example embodiments, if the period of time that a voltage is applied to the first electrode 216 or the second electrode 217 is controlled, the amount of the water-soluble liquid 240 filled in the channel 260 may be adjusted. Therefore, when the period of time that a voltage is applied to the first electrode 216 or the second electrode 217 is controlled, the motion of the water-soluble liquid 240 filled in the channel 260 may be adjusted as illustrated in FIG. 6. Thus, a desired gray scale may be represented.

Figure 7:
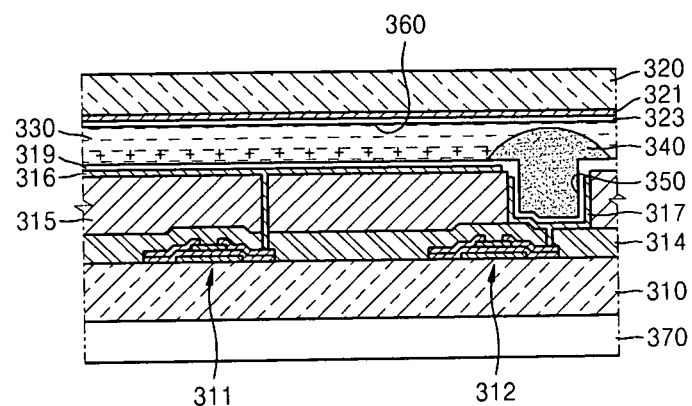

FIG. 7 is a cross-sectional view of a transmission-type display device according to example embodiments. For convenience of explanation, FIG. 7 illustrates a cross-section of a single pixel of the transmission-type display device according to example embodiments. The transmission-type display device according to example embodiments will now be described by focusing on differences between example embodiments.

Referring to FIG. 7, a first substrate 310, as a lower substrate, and a second substrate 320, as an upper substrate, may be arranged a predetermined or given distance apart from each other. First and second TFTs 311 and 312 may be formed on an upper surface of the first substrate 310. A protection layer 314 may be formed on the first substrate 310 to cover the first and second TFTs 311 and 312. A reservoir layer 315 may be formed on the protection layer 314. A reservoir 350 for storing oil 340 having a predetermined or given color (for example, red) and transparent water-soluble liquid 330, which is described later, may be disposed in the reservoir layer 315.

A first electrode 316 may be formed on an upper surface of the reservoir layer 315. The first electrode 316 may be electrically connected to the first TFT 311 via a path through the reservoir layer 315 and the protection layer 314. The first electrode 316 may be formed of a transparent conductive material, e.g., ITO and/or a metal. A second electrode 317 may be formed on an inner wall of the reservoir 350. The second electrode 317 may be electrically connected to the second TFT 312 via a path through the protection layer 314. The second electrode 317 may be formed of a transparent conductive material, e.g., ITO and/or a metal.

A first dielectric layer 319 may be formed on the reservoir layer 315 to cover the first and second electrodes 316 and 317. The first dielectric layer 319 has a hydrophobic surface. A third electrode 321 may be formed on a lower surface of the second substrate 320. The third electrode 321 may be formed of a transparent conductive material, e.g., ITO. A second dielectric layer 323 may be formed on the lower surface of the second substrate 320 to cover the third electrode 321. The second dielectric layer 323 has a hydrophobic surface, like the first dielectric layer 319.

A channel 360 may be formed between the first and third electrodes 316 and 321 and leads to the reservoir 350 between the second and third electrodes 317 and 321. The reservoir 350 may be formed on one side of the channel 360. The channel 360 and the reservoir 350 in between the first dielectric layer 319 and the second dielectric layer 323 may be filled with the transparent water-soluble liquid 330 and the oil 340 having the predetermined or given color (for example, red). The transparent water-soluble liquid 330 may include, for example, water. A backlight unit 370 may be installed on a lower surface of the first substrate 310 and may radiate white light in a direction from the 310 to the 320.

The transmission-type display device according to example embodiments forms an image by using the white light radiated by the backlight unit 370 instead of using natural external light. The transmission-type display device according to example embodiments may be the same as the reflection-type display device illustrated in FIGS. 1 through 3 except that the backlight unit 370 may be installed on the lower surface of the first substrate 310 and that the first electrode 316 may be formed of a material that transmits light. Thus, a process in which the transmission-type display device according to example embodiments forms an image may be similar to that for the reflection-type display device illustrated in FIGS. 1 through 3, and thus, a detailed description thereof will be omitted. FIG. 7 illustrates a state of the transmission-type display device where a voltage may be applied to only the first electrode 316 and no voltage may be applied to the second electrode 317. According to example embodiments, a gray scale representation may be achieved according to the magnitude of the voltage applied to the first electrode 316 or the second electrode 317.

Figure 8:
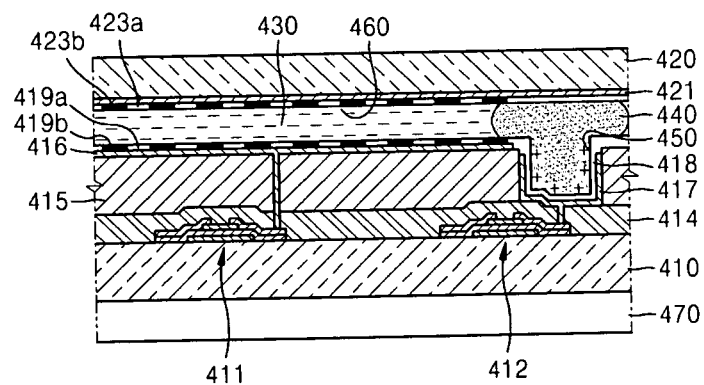

FIG. 8 is a cross-sectional view of a transmission-type display device according to example embodiments. For convenience of explanation, FIG. 8 illustrates a cross-section of a single pixel of the transmission-type display device according to example embodiments. The transmission-type display device according to example embodiments will now be described by focusing on differences between example embodiments.

Referring to FIG. 8, a first substrate 410, as a lower substrate, and a second substrate 420, as an upper substrate, may be arranged a predetermined or given distance apart from each other. First and second TFTs 411 and 412 may be formed on an upper surface of the first substrate 410. A protection layer 414 may be formed on the first substrate 410 to cover the first and second TFTs 411 and 412. A reservoir layer 415 may be formed on the protection layer 414. A reservoir 450 for storing water-soluble liquid 440 having a predetermined or given color (for example, red) and transparent oil 430, which is described later, may be disposed in the reservoir layer 415.

A first electrode 416 may be formed on an upper surface of the reservoir layer 415. The first electrode 416 may be electrically connected to the first TFT 411 via a path through the reservoir layer 415 and the protection layer 414. The first electrode 416 may be formed of a transparent conductive material, e.g., ITO and/or a metal. A second electrode 417 may be formed on an inner wall of the reservoir 450. The second electrode 417 may be electrically connected to the second TFT 412 via a path through the protection layer 414. The second electrode 417 may be formed of a transparent conductive material, e.g., ITO and/or a metal.

A plurality of first dielectric layers 419a and a plurality of second dielectric layers 419b may be alternately formed on the reservoir layer 415 to cover the first electrode 416. Surfaces of the first and second dielectric layers 419a and 419b may be hydrophobic and hydrophilic, respectively. The first and second dielectric layers 419a and 419b may alternate with each other in a direction in which the water-soluble liquid 440 may move. The first and second dielectric layers 419a and 419b may be formed in a stripe pattern. A third dielectric layer 418 having a hydrophobic surface may be formed on the inner wall of the reservoir 450 to cover the second electrode 417.

A third electrode 421 may be formed on a lower surface of the second substrate 420. The third electrode 421 may be formed of a transparent conductive material, e.g., ITO. A plurality of fourth dielectric layers 423a and a plurality of fifth dielectric layers 423b may be alternately formed on the lower surface of the second substrate 420 to cover the third electrode 421. Surfaces of the fourth and fifth dielectric layers 423a and 423b may be hydrophobic and hydrophilic, respectively. The fourth and fifth dielectric layers 423a and 423b may alternate with each other so as to face the first and second dielectric layers 419a and 419b, respectively.

A channel 460 may be formed between the first and third electrodes 416 and 421 and leads to the reservoir 450 between the second and third electrodes 417 and 421. The reservoir 450 may be formed on one side of the channel 460. The channel 460 and the reservoir 450 in between the first, second, and third dielectric layers 419a, 419b, and 418 and the fourth and fifth dielectric layers 423a and 423b may be filled with the transparent oil 430 and the water-soluble liquid 440 having the predetermined or given color (for example, red). A backlight unit 470 may be installed on a lower surface of the first substrate 410 and may radiate white light in a direction from the first substrate 410 to the second substrate 420.

The transmission-type display device according to example embodiments may be the same as the reflection-type display device illustrated in FIGS. 4 through 6 except that the backlight unit 470 may be installed on the lower surface of the first substrate 410 and that the first electrode 416 may be formed of a material that transmits light. Thus, a process in which the transmission-type display device according to example embodiments forms an image may be similar to the reflection-type display device illustrated in FIGS. 4 through 6 except that an image may be formed using the white light radiated by the backlight unit 470 instead of using natural external light, and thus, a detailed description thereof will be omitted. FIG. 8 illustrates a state of the transmission-type display device where no voltage may be applied to the first electrode 416 and a voltage may be applied to only the second electrode 417. According to example embodiments, a gray scale representation may be achieved according to a period of time that a voltage may be applied to the first electrode 416 or the second electrode 417.

Figure 9:
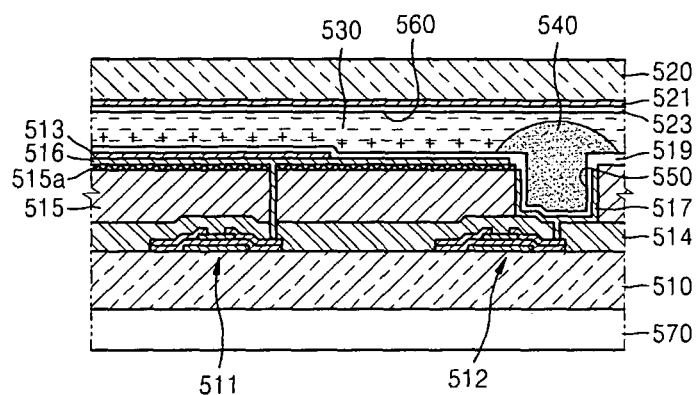

FIG. 9 is a cross-sectional view of a reflection and transmission-type display device according to example embodiments. For convenience of explanation, FIG. 9 illustrates a cross-section of a single pixel of the reflection and transmission-type display device according to the example embodiments.

Referring to FIG. 9, a first substrate 510, as a lower substrate, and a second substrate 520, as an upper substrate, may be arranged a predetermined or given distance apart from each other. First and second TFTs 511 and 512 may be formed on an upper surface of the first substrate 510. A protection layer 514 may be formed on the first substrate 510 to cover the first and second TFTs 511 and 512.

A reservoir layer 515 may be formed on the protection layer 514. A reservoir 550 may be formed in the reservoir layer 515. A first electrode 516 may be formed on an upper surface of the reservoir layer 515. The first electrode 516 may be electrically connected to the first TFT 511 via a path through the reservoir layer 515 and the protection layer 514. The first electrode 516 may be formed of a transparent conductive material. An optical pattern 515a that diffuses light may be further formed on the upper surface of the reservoir layer 515 so as to be interposed between the first electrode 516 and the reservoir layer 515. A fourth electrode 513 may be formed on an upper surface of the first electrode 516. In example embodiments, the fourth electrode 513 covers a portion of the first electrode 516 and may be formed of metal that reflects light.

A second electrode 517 may be formed on an inner wall of the reservoir 550. The second electrode 517 may be electrically connected to the second TFT 512 via a path through the protection layer 514. The second electrode 517 may be formed of a transparent conductive material or a metal. A first dielectric layer 519 may be formed on the reservoir layer 515 to cover the first, second, and fourth electrodes 516, 517, and 513. The first dielectric layer 519 has a hydrophobic surface. A third electrode 521 may be formed on a lower surface of the second substrate 520. The third electrode 521 may be formed of a transparent conductive material, e.g., ITO. A second dielectric layer 523 may be formed on the lower surface of the second substrate 520 to cover the third electrode 521. The second dielectric layer 523 has a hydrophobic surface, like the first dielectric layer 519.

A channel 560, in which transparent water-soluble liquid 530 and oil 540 having a predetermined or given color move, may be formed between the first and fourth electrodes 516 and 513 and the third electrode 521 and leads to the reservoir 550. The reservoir 550 may be formed on one side of the channel 560. The channel 560 and the reservoir 550 may be filled with the transparent water-soluble liquid 530 and the oil 540 having the predetermined or given color. A backlight unit 570 may be installed on a lower surface of the first substrate 510 and may radiate white light in a direction from the first substrate 510 to the second substrate 520.

In the above-described reflection and transmission-type display device, an area including the fourth electrode 513 formed of a reflective metal may serve as a reflection-type display area, and an area not including the fourth electrode 513 but including the first electrode 516 formed of a transparent conductive material may serve as a transmission-type display area. A process in which an image may be formed using the reflection-type display area may be similar to that for the reflection-type display device illustrated in FIGS. 1 through 3, and thus, a detailed description thereof will be omitted.

A process in which an image may be formed using the transmission-type display area may be similar to the transmission-type display device illustrated in FIG. 7, and thus, a detailed description thereof will be omitted. According to example embodiments, a gray scale representation may be achieved according to the magnitude of a voltage applied to the first, second, or fourth electrode 516, 517, or 513, as described above.

Because the reflection and transmission-type display device according to example embodiments forms an image using the reflection-type display area and the transmission-type display area, an image having higher reflectivity and higher transmissivity can be obtained not only in bright places, e.g., outdoors, but also in dark places, e.g., indoors.

Figure 10:
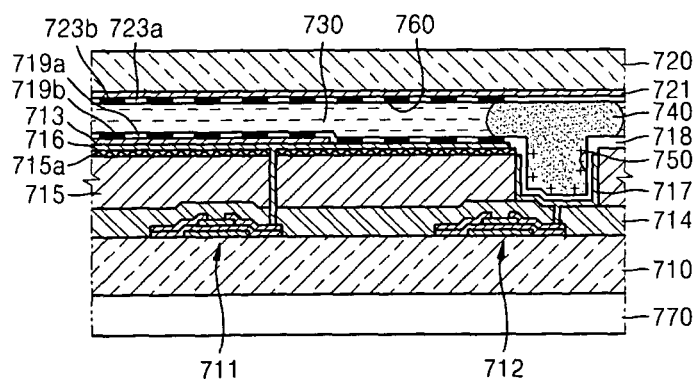

FIG. 10 is a cross-sectional view of a reflection and transmission-type display device according to example embodiments. For convenience of explanation, FIG. 10 illustrates a cross-section of a single pixel of the reflection and transmission-type display device according to example embodiments.

Referring to FIG. 10, a first substrate 710, as a lower substrate, and a second substrate 720, as an upper substrate, may be arranged a predetermined or given distance apart from each other. First and second TFTs 711 and 712 may be formed on an upper surface of the first substrate 710. A protection layer 714 may be formed on the first substrate 710 to cover the first and second TFTs 711 and 712. A reservoir layer 715 may be formed on the protection layer 714. A reservoir 750 may be formed in the reservoir layer 715. A first electrode 716 may be formed on an upper surface of the reservoir layer 715. The first electrode 716 may be electrically connected to the first TFT 711. The first electrode 516 may be formed of a transparent conductive material. An optical pattern 515a that diffuses light may be further formed on the upper surface of the reservoir layer 515 so as to be interposed between the first electrode 516 and the reservoir layer 515.

A fourth electrode 713 may be formed on an upper surface of the first electrode 716. In example embodiments, the fourth electrode 713 covers a portion of the first electrode 716 and may be formed of a metal that reflects light. A second electrode 717 may be formed on an inner wall of the reservoir 750. The second electrode 717 may be electrically connected to the second TFT 712 via the protection layer 714. The second electrode 717 may be formed of a transparent conductive material or a metal.

A plurality of first dielectric layers 719a and a plurality of second dielectric layers 719b may be alternately formed on the reservoir layer 715 to cover the first and fourth electrodes 716 and 713. Surfaces of the first and second dielectric layers 719a and 719b may be hydrophobic and hydrophilic, respectively. The first and second dielectric layers 719a and 719b may alternate with each other in a direction in which the water-soluble liquid 740 may move. The first and second dielectric layers 719a and 719b may be formed in a stripe pattern. A third dielectric layer 718 having a hydrophobic surface may be formed on the inner wall of the reservoir 750 to cover the second electrode 717.

A third electrode 721 may be formed on a lower surface of the second substrate 720. The third electrode 721 may be formed of a transparent conductive material, e.g., ITO. A plurality of fourth dielectric layers 723a and a plurality of fifth dielectric layers 723b may be alternately formed on the lower surface of the second substrate 720 to cover the third electrode 721. Surfaces of the fourth and fifth dielectric layers 723a and 723b may be hydrophobic and hydrophilic, respectively. The fourth and fifth dielectric layers 723a and 723b may alternate with each other so as to face the first and second dielectric layers 719a and 719b, respectively.

A channel 760, in which transparent oil 730 and water-soluble liquid 740 having a predetermined or given color move, may be formed between the first and fourth electrodes 716 and 713 and the third electrode 721 and leads to the reservoir 750. The reservoir 750 may be formed on one side of the channel 760. The channel 760 and the reservoir 750 may be filled with the transparent oil 730 and the water-soluble liquid 740 having the predetermined or given color. A backlight unit 770 may be installed on a lower surface of the first substrate 710 and may radiate white light in a direction from the first substrate 710 to the second substrate 720.

In the above-described reflection and transmission-type display device, an area including the fourth electrode 713 formed of a reflective metal may serve as a reflection-type display area, and an area not including the fourth electrode 713 but including the first electrode 716 formed of a transparent conductive material may serve as a transmission-type display area. A process in which an image may be formed using the reflection-type display area may be similar to the reflection-type display device illustrated in FIGS. 4 through 6, and thus, a detailed description thereof will be omitted.

A process in which an image may be formed using the transmission-type display area may be similar to that for the transmission-type display device illustrated in FIG. 8, and thus a detailed description thereof will be omitted. According to example embodiments, a gray scale representation may be achieved according to the period of time that a voltage is applied to the first, second, or fourth electrode 716, 717, or 713, as described above.

Because the reflection and transmission-type display device according to example embodiments forms an image using the reflection-type display area and the transmission-type display area, an image having higher reflectivity and higher transmissivity may be obtained not only in bright places e.g., outdoors, but also in dark places, e.g., indoors. In addition, because the plurality of first dielectric layers 719a and the plurality of second dielectric layers 719b having hydrophobic surfaces and hydrophilic surfaces, respectively, alternate with each other, and the plurality of fourth dielectric layers 723a and the plurality of fifth dielectric layers 723b having hydrophobic surfaces and hydrophilic surfaces, respectively, alternate with each other, even when the voltage applied to the second electrode 717 is turned off, an image may be maintained without changes before the turning off the voltage. Therefore, bistability may be secured, and power consumption required to drive a display device may be reduced.

It should be understood that example embodiments described therein should be considered in a descriptive sense only and not for purposes of limitation. Descriptions of features or aspects within each embodiment should typically be considered as available for other similar features or aspects in other example embodiments.

What is claimed is:

1. A display device including a plurality of pixels, each comprising:
    a first substrate and a second substrate arranged a distance apart from each other;
    a reservoir layer on the first substrate and including a reservoir;
    a first electrode and a second electrode on an upper surface of the reservoir layer and on an inner wall of the reservoir, respectively;
    a first dielectric layer, having a plurality of dielectric layers, on the reservoir layer to cover the first and second electrodes, the plurality of dielectric layers in the first dielectric layer include hydrophobic surfaces and hydrophilic surfaces in an alternate manner;
    a third electrode on a lower surface of the second substrate;
    a second dielectric layer, having a plurality of dielectric layers, on the lower surface of the second substrate to cover the third electrode, the plurality of dielectric layers in the second dielectric layer include hydrophobic surfaces and hydrophilic surfaces in an alternate manner;
    a third dielectric layer on the inner wall of the reservoir to cover the second electrode the third dielectric layer having a hydrophobic surface;
    a transparent water-soluble liquid and an oil having a color filling a space between the first dielectric layer and the second dielectric layer; and
    an optical pattern between the first electrode and the reservoir layer, the optical pattern diffusing light on the upper surface of the reservoir layer.

2. The display device of claim 1, further comprising:
a first thin film transistor (TFT) applying a voltage to the first electrode; and
a second TFT applying a voltage to the second electrode, wherein the first and second TFTs are on the first substrate.

3. The display device of claim 2, further comprising:
a protection layer on the first substrate to cover the first and second TFTs.

4. The display device of claim 1, wherein the first electrode includes a reflective metal.

5. The display device of claim 1, wherein the third electrode includes a transparent conductive material.

6. The display device of claim 1, wherein a gray scale is controlled according to a magnitude of a voltage applied to the first electrode or the second electrode.

7. The display device of claim 1, further comprising:
a backlight unit on a lower surface of the first substrate.

8. The display device of claim 7, wherein the first electrode includes a transparent conductive material.

9. The display device of claim 8, further comprising:
a fourth electrode on an upper surface of the first electrode to cover a portion of the first electrode.

10. The display device of claim 9, wherein the fourth electrode includes reflective metal.

11. A display device including a plurality of pixels, each comprising:
a first substrate and a second substrate arranged a distance apart from each other;
a reservoir layer on the first substrate and including a reservoir;
a first electrode and a second electrode on an upper surface of the reservoir layer and on an inner wall of the reservoir, respectively;
a plurality of first dielectric layers and a plurality of second dielectric layers alternately formed on the upper surface of the reservoir layer to cover the first electrode, the plurality of first and second dielectric layers having hydrophobic surfaces and hydrophilic surfaces, respectively;
a third dielectric layer on the inner wall of the reservoir to cover the second electrode, the third dielectric layer having a hydrophobic surface;
a third electrode on a lower surface of the second substrate;
a plurality of fourth dielectric layers and a plurality of fifth dielectric layers alternately formed on a lower surface of the second substrate to cover the third electrode, the plurality of fourth and fifth dielectric layers having hydrophobic surfaces and hydrophilic surfaces, respectively; and
a transparent oil and a water-soluble liquid having a color filling a space between the first, second, and third dielectric layers and the fourth and fifth dielectric layers.

12. The display device of claim 11, further comprising:
a first TFT applying a voltage to the first electrode; and
a second TFT applying a voltage to the second electrode, wherein the first and second TFTs are formed on the first substrate.

13. The display device of claim 12, further comprising:
a protection layer on the first substrate to cover the first and second TFTs.

14. The display device of claim 11, wherein the first and second dielectric layers alternate with each other in a direction in which the water-soluble liquid moves, and the fourth and fifth dielectric layers alternate with each other in the direction in which the water-soluble liquid moves.

15. The display device of claim 11, wherein the first electrode includes a reflective metal.

16. The display device of claim 15, further comprising:
an optical pattern between the first electrode and the reservoir layer, the optical pattern diffusing light on a surface of the reservoir layer.

17. The display device of claim 16, wherein the third electrode includes a transparent conductive material.

18. The display device of claim 11, wherein a gray scale is controlled according to a period of time that a voltage is applied to the first electrode or the second electrode.

19. The display device of claim 11, further comprising:
a backlight unit on a lower surface of the first substrate.

20. The display device of claim 19, wherein the first electrode includes a transparent conductive material.

21. The display device of claim 20, further comprising:
a fourth electrode on an upper surface of the first electrode to cover a portion of the first electrode.

22. The display device of claim 21, wherein the fourth electrode includes reflective metal.

* * * * *